US012338069B2

(12) United States Patent
Acciavatti

(10) Patent No.: US 12,338,069 B2
(45) Date of Patent: Jun. 24, 2025

(54) METHOD FOR AUTOMATICALLY HANDLING A PLURALITY OF PRODUCT CONTAINERS, AND A RELATED SYSTEM

(71) Applicant: Fameccanica.Data S.p.A., San Giovanni Teatino (IT)

(72) Inventor: Andrea Acciavatti, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 406 days.

(21) Appl. No.: 17/992,330

(22) Filed: Nov. 22, 2022

(65) Prior Publication Data

US 2023/0166908 A1 Jun. 1, 2023

(30) Foreign Application Priority Data

Nov. 26, 2021 (EP) ..................... 21210646

(51) Int. Cl.
*B65G 1/04* (2006.01)
*B65G 1/06* (2006.01)
*B65G 1/14* (2006.01)

(52) U.S. Cl.
CPC ............. *B65G 1/0435* (2013.01); *B65G 1/06* (2013.01); *B65G 1/14* (2013.01)

(58) Field of Classification Search
CPC ...... B65G 1/0407; B65G 1/0435; B65G 1/06; B65G 1/14
See application file for complete search history.

(56) References Cited

U.S. PATENT DOCUMENTS

| 5,964,562 A * | 10/1999 | Bernard | B65G 1/045 |
| | | | 414/277 |
| 2019/0143872 A1 | 5/2019 | Gil | |
| 2019/0202635 A1 | 7/2019 | Conrad et al. | |
| 2021/0371203 A1* | 12/2021 | O'Brien | B65G 47/915 |
| 2022/0135323 A1* | 5/2022 | Kimura | B65G 1/0435 |
| | | | 414/266 |
| 2022/0185583 A1* | 6/2022 | Kong | B07C 3/008 |

FOREIGN PATENT DOCUMENTS

| DE | 3830373 A1 | 3/1989 |
| EP | 3418221 A1 | 12/2018 |
| JP | H04341406 A | 11/1992 |
| WO | 9947436 A1 | 9/1999 |
| WO | 2020196144 A1 | 10/2020 |

OTHER PUBLICATIONS

European Search Report dated May 18, 2022. 9 pages.

* cited by examiner

*Primary Examiner* — Kaitlin S Joerger
(74) *Attorney, Agent, or Firm* — RMCK Law Group PLC

(57) ABSTRACT

A method and system are provided for automatically handling a plurality of product containers. The method comprises the steps of: providing a container shifting apparatus including at least one platform for temporarily hosting containers to be transferred, moving the platform along a conveyor device and a shelving unit, and driving shifting means for shifting containers from the conveyor device to the shelving unit, and vice-versa, via the platform.

8 Claims, 9 Drawing Sheets

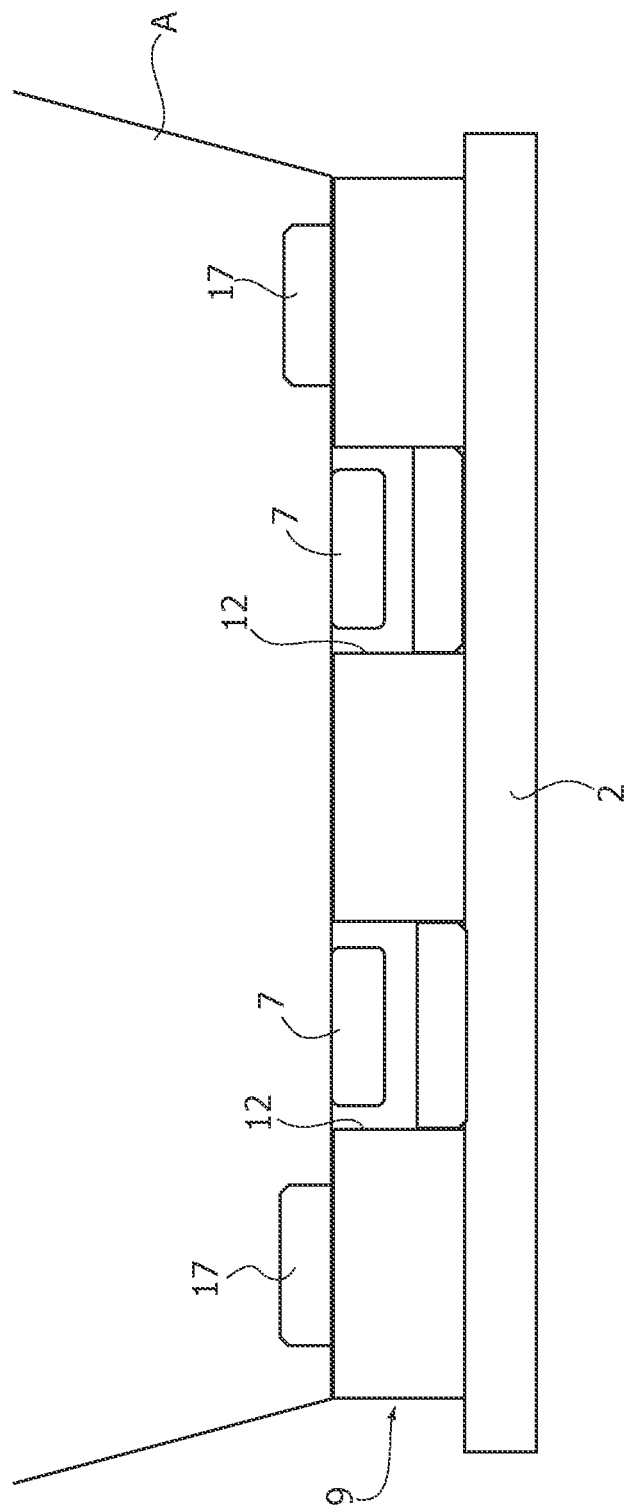

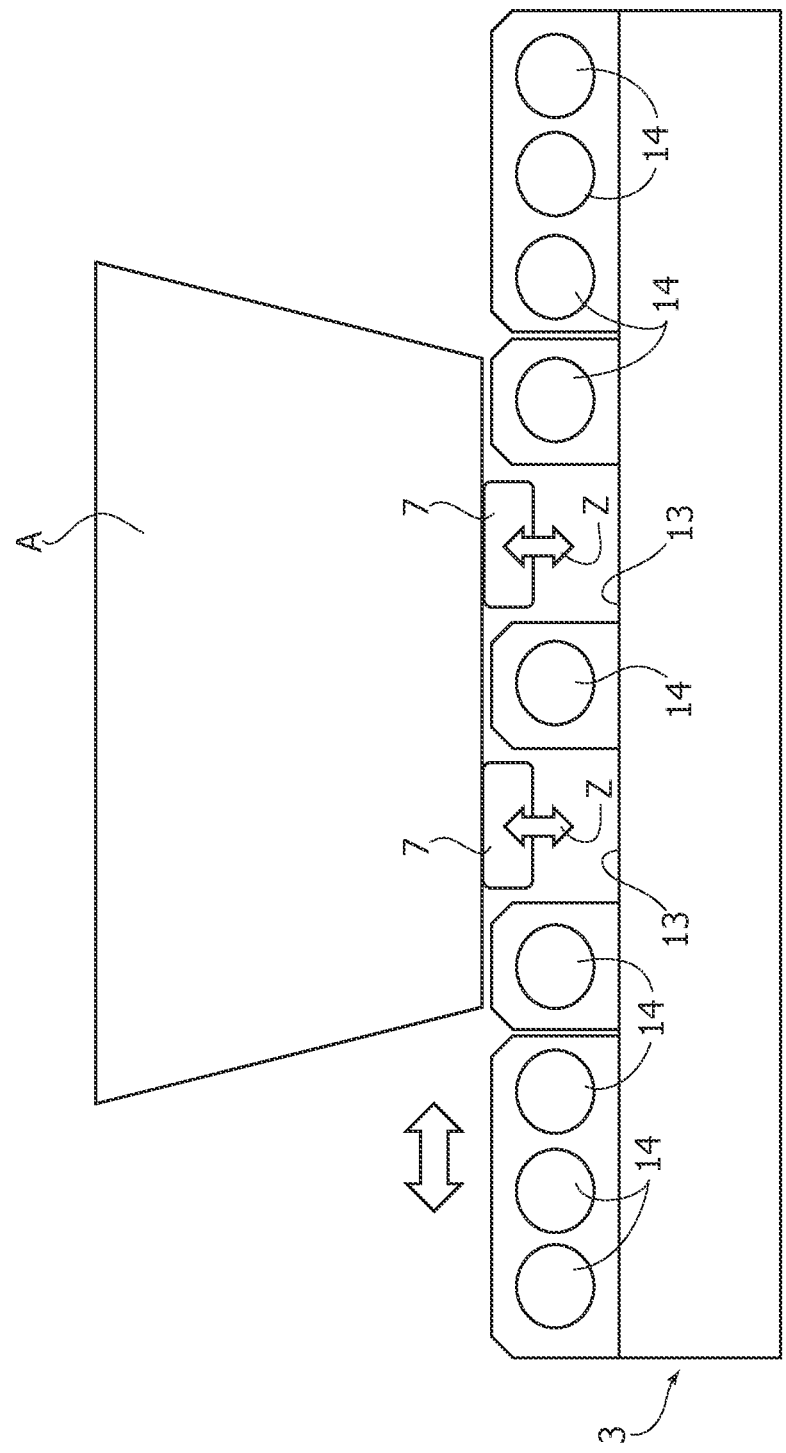

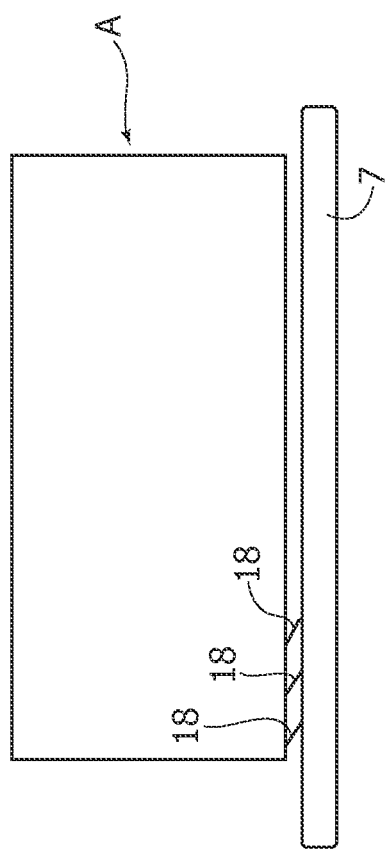
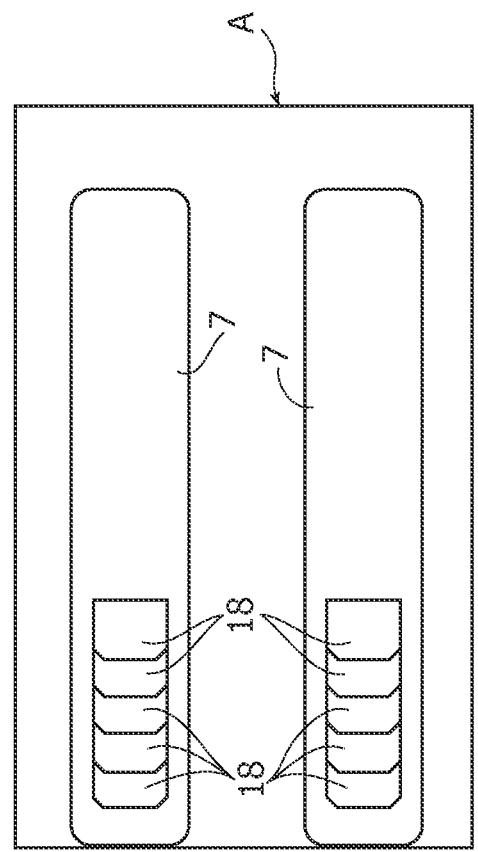

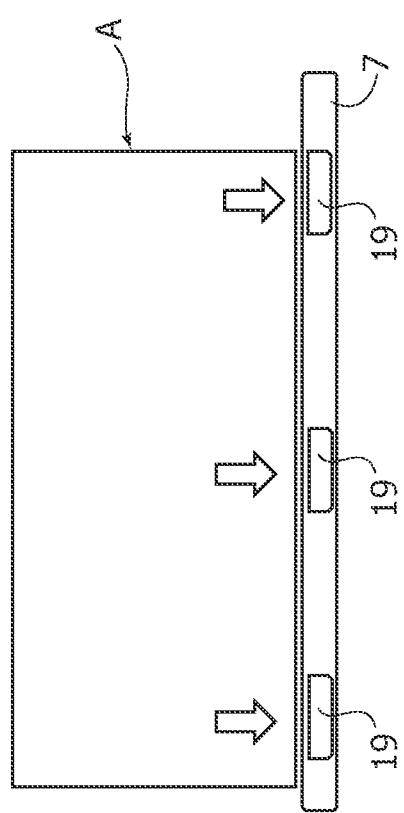
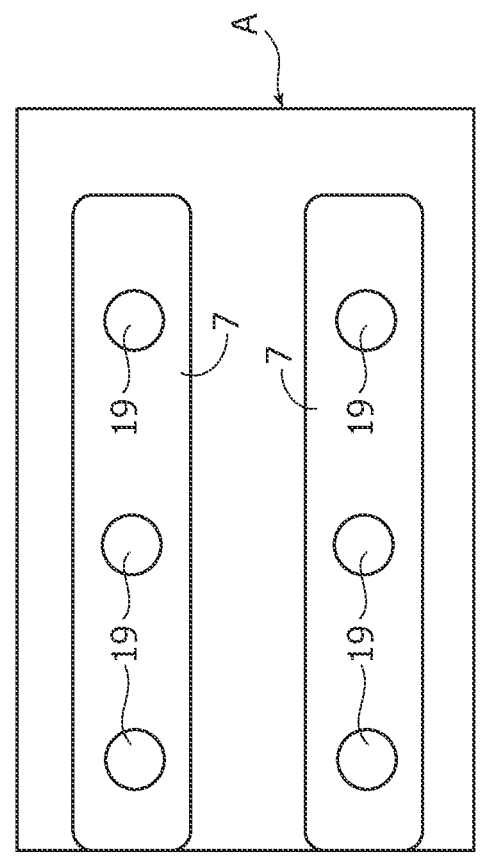

METHOD FOR AUTOMATICALLY HANDLING A PLURALITY OF PRODUCT CONTAINERS, AND A RELATED SYSTEM

CROSS-REFERENCE TO RELATED APPLICATION

This application claims priority to European Patent Application No. 21210646.2 filed Nov. 26, 2021. The disclosure of the above application is incorporated herein by reference in its entirety.

FIELD OF THE INVENTION

The present invention relates in general to the field of logistics, in particular to the field of logistics in warehouses or industrial plants for managing products, containers, boxes, packages, materials, etc.

More specifically, the invention relates to a method for automatically handling a plurality of product containers, such as tote-boxes which are used in industrial and commercial environments for secure stacking and effective content protection.

Embodiments of the present invention also relates to an automatic warehouse system for handling a plurality of product containers.

DESCRIPTION OF THE RELATED ART

To date, logistic activities related to managing product containers, packages and boxes to be delivered to respective destinations are substantially totally entrusted to manual operations carried out by trained operators. Usually, the products to be delivered are contained in respective containers, such as tote-boxes, which are stacked at pick-up stations, in which a human operator reads a barcode through a barcode reader, or visually reads the label, and manually grasps the container for delivering to a specific shipping area.

According to known solutions, the containers are transported by means of a conveyor towards a pick-up station. An operator manually moves the containers from the conveyor to a shelving unit for holding a plurality of containers. When the containers have to be shipped, an operator manually picks the containers for delivering to a proper shipping area.

According to further known solutions, the containers may be transported by means of forklift trucks which may engage the containers on the shelves.

The main drawback of these known solutions is given by the fact that the operations are substantially totally manual, therefore subjected to mistakes and requiring proper training for the operators, without ensuring high repeatability and reliability of the operations. The solution related to forklift trucks have problems due to the overall dimensions of the forks and do not ensure sufficient stability during the extraction phase of the containers from the shelves and during handling of the load extracted.

Furthermore, the manual transport may cause non-ergonomic actions to be carried out by the operators.

OBJECT AND SUMMARY OF THE INVENTION

The object of the present invention is to provide a method and a system for automatically handling a plurality of product containers which overcome the problems and the limitations of the prior art.

In accordance with the present invention, this object is achieved by a method having the features of claim 1.

Optional features of the invention form the subject of the dependent claims.

The claims are an integral part of the disclosure submitted in relation to the invention.

BRIEF DESCRIPTION OF THE DRAWINGS

Further characteristics and advantages of the invention will become clear from the following description, given purely as a non-limiting example, with reference to the attached drawings, wherein:

FIG. 2A is a schematic front view of a shelving unit carrying product containers, according to an embodiment of the present invention, FIG. 4 is a schematic front view of a conveyor device carrying product containers, according to an embodiment of the present invention, FIGS. 7A, 7B are respectively a schematic cross-sectional view and a schematic plan view illustrating additional features according to an embodiment of the invention, and FIGS. 8A, 8B are respectively a schematic cross-sectional view and a schematic plan view illustrating additional features according to a further embodiment of the invention.

DETAILED DESCRIPTION

Figure 1:
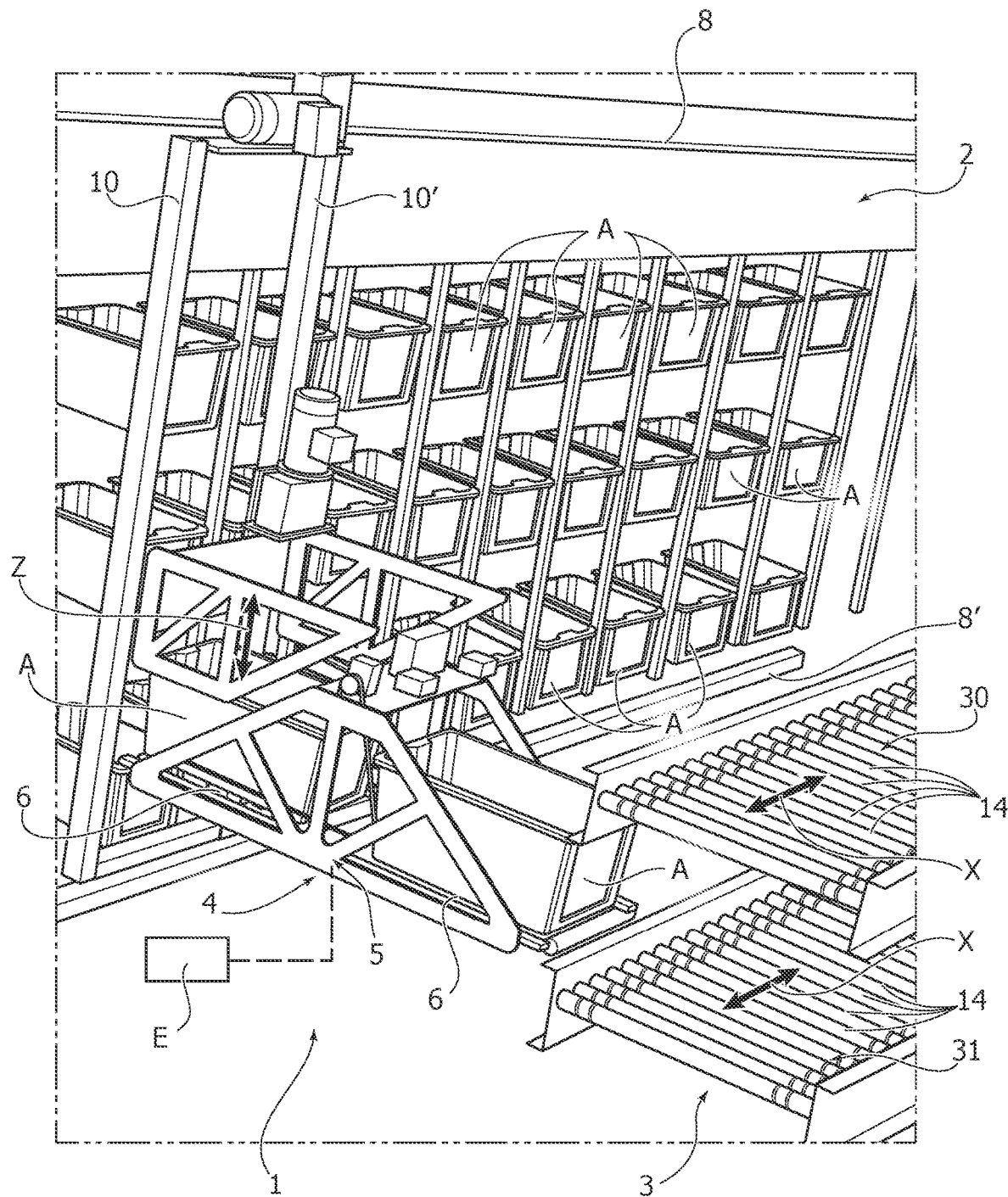
FIG. 1 is a perspective view of an automated system for handling product containers, according to an embodiment of the present invention.
Figure 5:
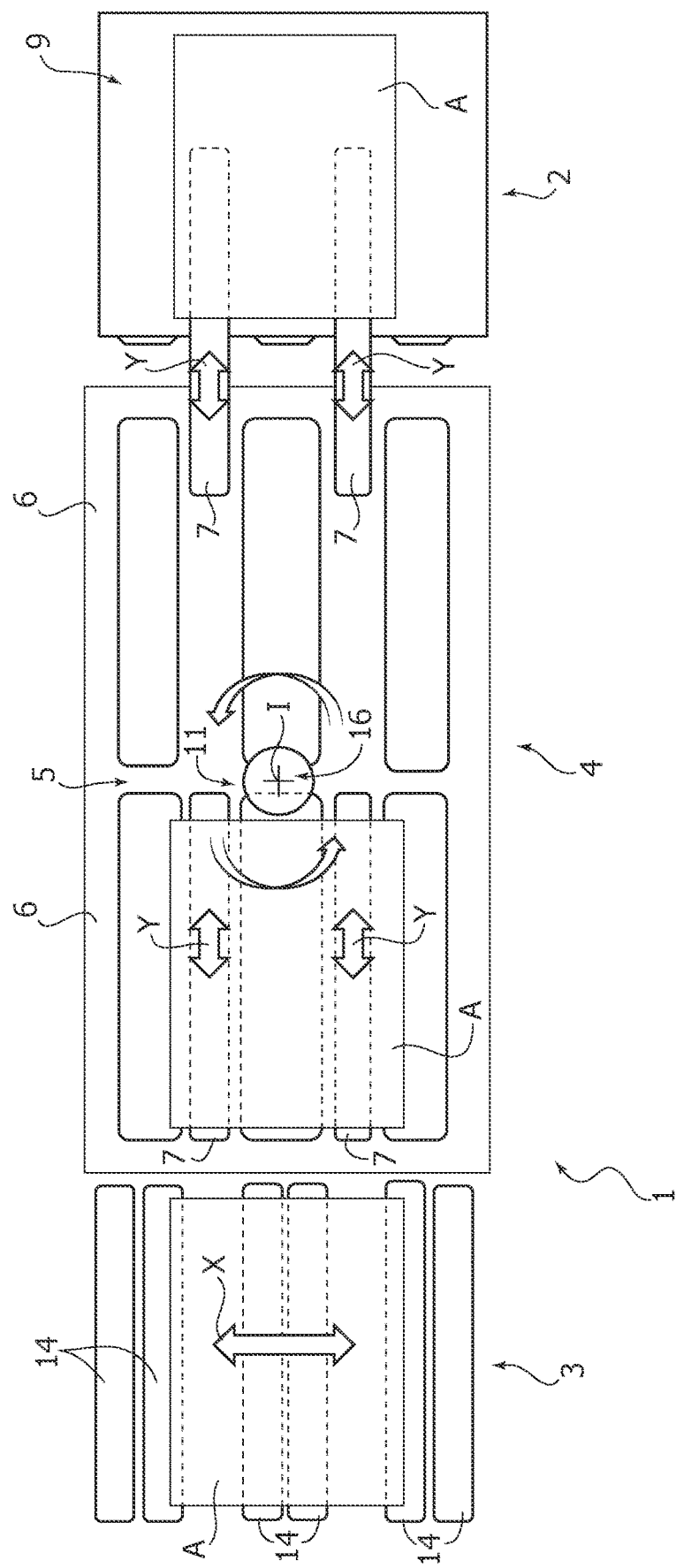
FIGS. 5, 6 are schematic plan views showing the system of the invention, according to a preferred embodiment.
Figure 6:
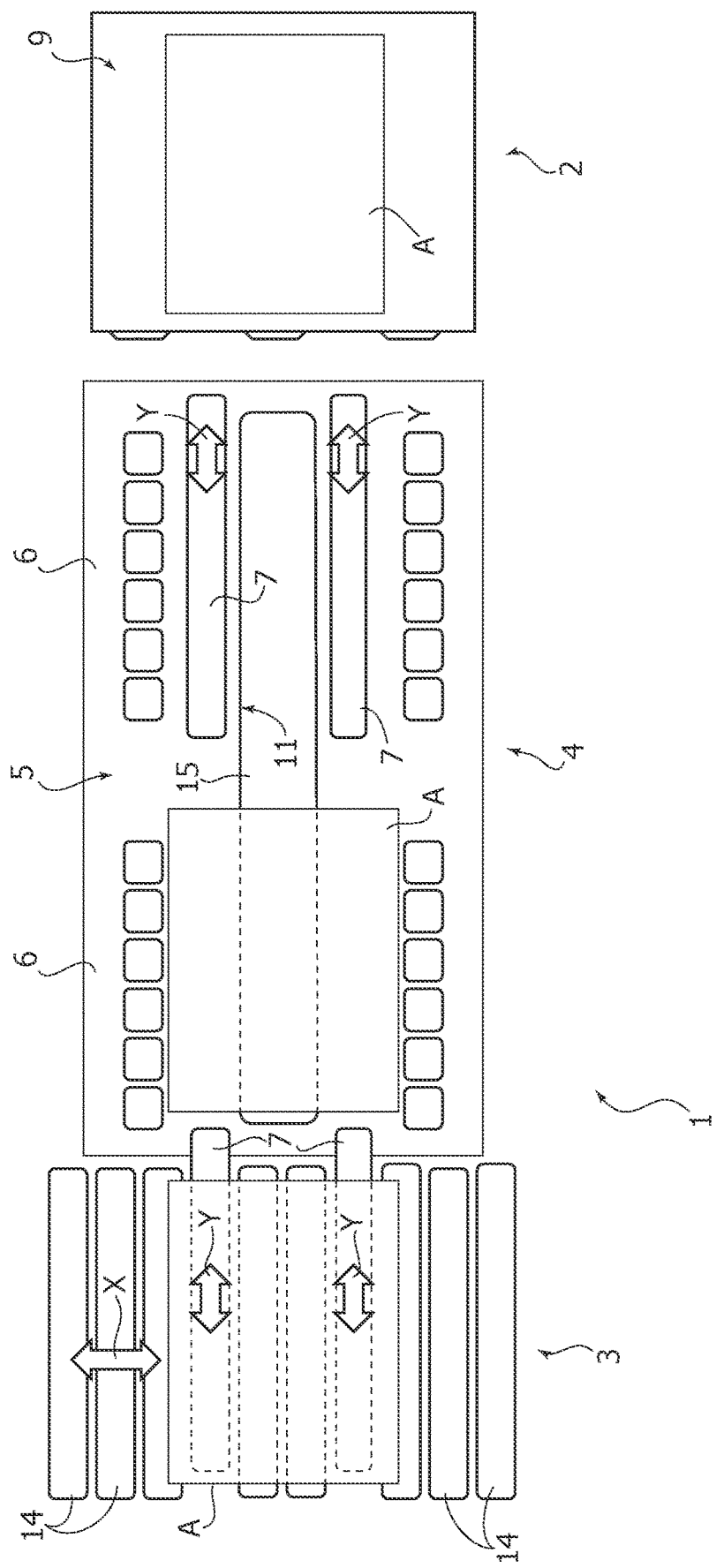

With reference to FIGS. 1,5,6, numeral reference 1 indicates an automatic warehouse system for handling product containers A. In the example shown in the figures, the product containers A are tote-boxes, provided for containing a plurality of products—for example consumer products—. The tote-boxes are widely used in industrial and commercial environments for secure stacking and content protection, in compliance with the industrial standards and regulations. Naturally, the present invention is also applicable to any kind of containers A having different shape and size, with respect to those illustrated in the figures.

The automatic warehouse system 1 comprises a conveyor device 3 provided for automatically moving a plurality of containers A from one location to another. By way of non-limiting example, the figures refer to a conveyor device of the motor-driven-roller type, with a plurality of rollers 14.

According to a preferred embodiment, the conveyor device 3 may comprise a first conveyor branch 30 configured for automatically transferring a plurality of empty containers A intended to be filled with products, for forming full containers A ready to be shipped. The conveyor device 3 may comprise a second conveyor branch 31 configured for automatically transferring a plurality of full containers A. The first and second conveyor branches 30, 31 are configured for optimizing the conveying flow from/to respective storage areas.

In one or more embodiments, the first and second branches 30, 31 are vertically overlapped to each other, in order to define a lower branch and an upper branch respectively provided for conveying empty and full containers A (or vice-versa). In this connection, in one more embodiments, the conveyor device 3 may comprise further branches vertically overlapped to the first and second branches 30, 31, in order to provide multiple vertical overlapped branches.

As explained more in detail in the following, the aforementioned conveyor device 3 is provided for enabling simultaneous circulation of both empty containers A to be filled with products and formed full containers A to be delivered to a proper final destination.

According to a further feature of the invention, the automatic warehouse system 1 comprises at least one shelving unit 2 comprising a plurality of compartments for holding and storing containers A arranged in rows. According to a preferred embodiment shown in FIG. 1, the rows are defined by a plurality of compartments vertically and horizontally adjacent to each other, so as to provide multiple vertical and horizontal rows of containers A. In one or more embodiments, the shelving unit 2 is provided for holding both empty and full containers A. In one or more embodiments, the shelving unit 2 is a powered carousel shelving unit configured to bring individual shelves to a standard accessible height at a front access opening.

Figure 2B:
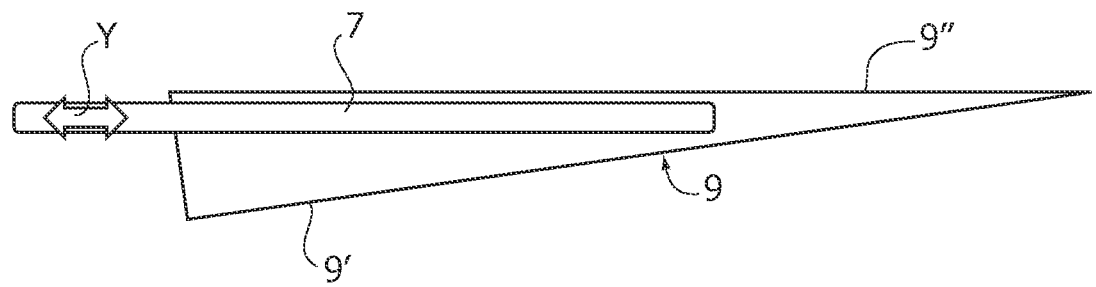
FIGS. 2B, 2C are respectively a schematic cross-sectional view and a schematic plan view of a shelving unit carrying product containers, according to the embodiment of FIG. 2A, FIGS. 3A, 3B are schematic lateral views illustrating the steps of a method for handling product containers, according to the invention.
Figure 2C:
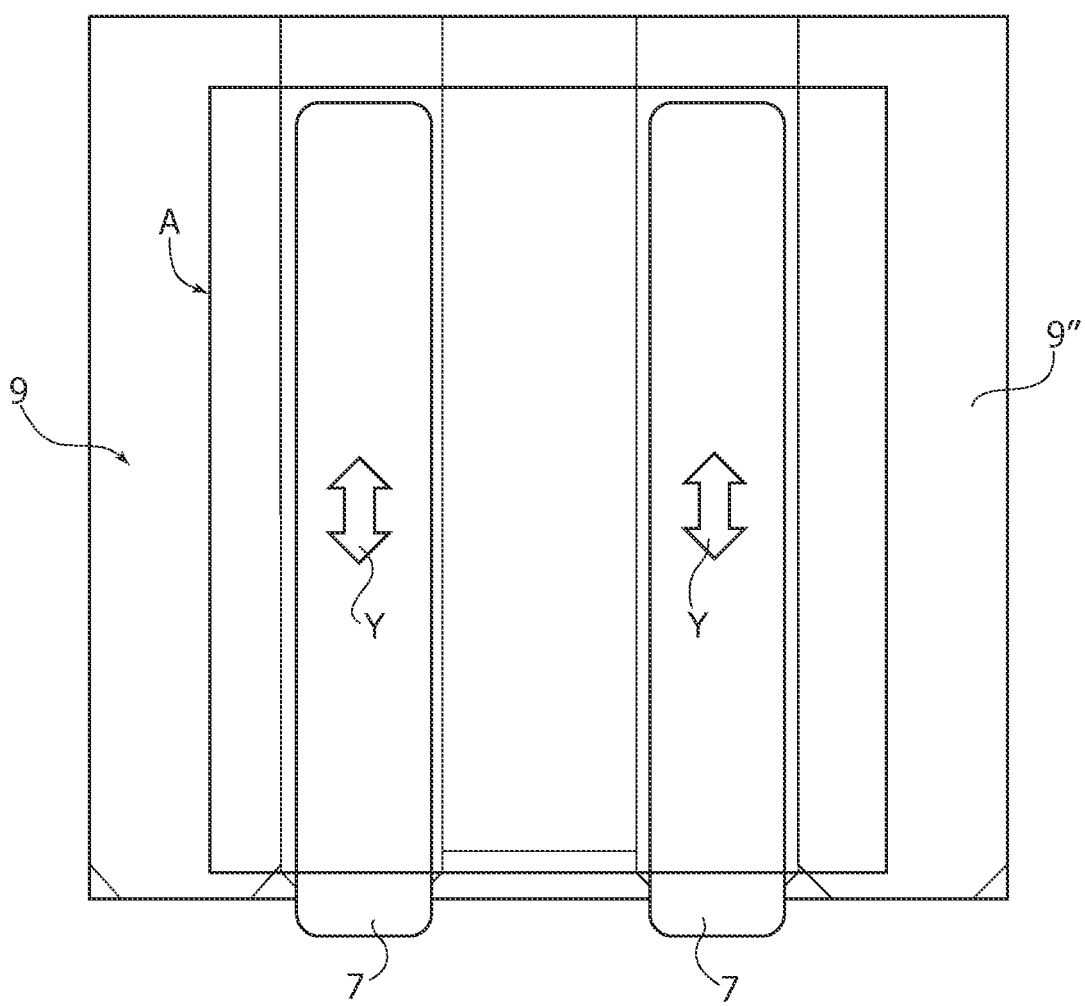
Figure 3A:
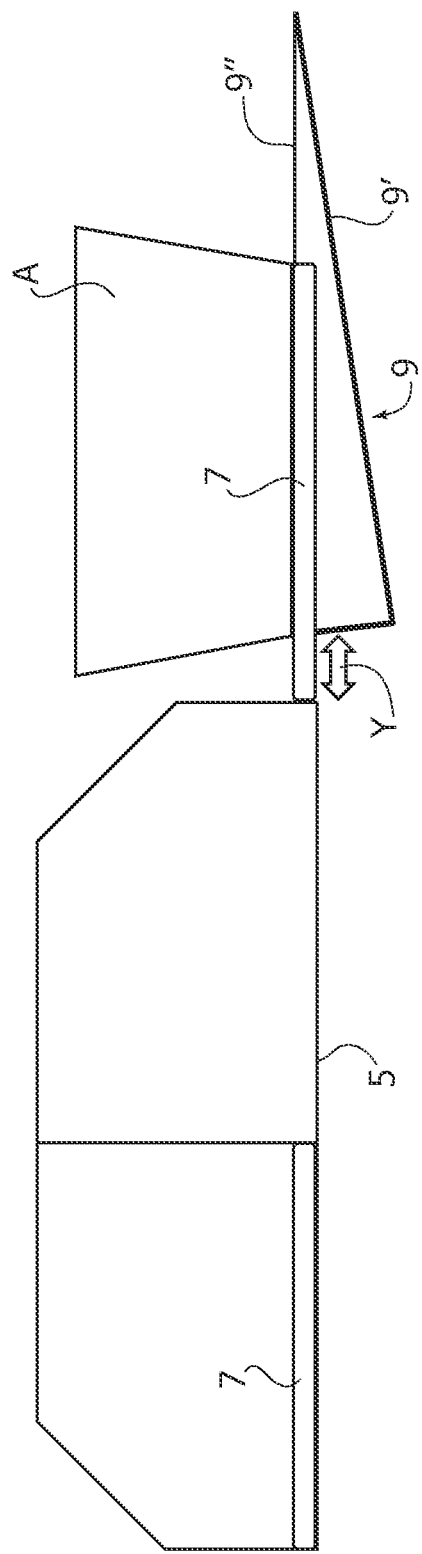
Figure 3B:
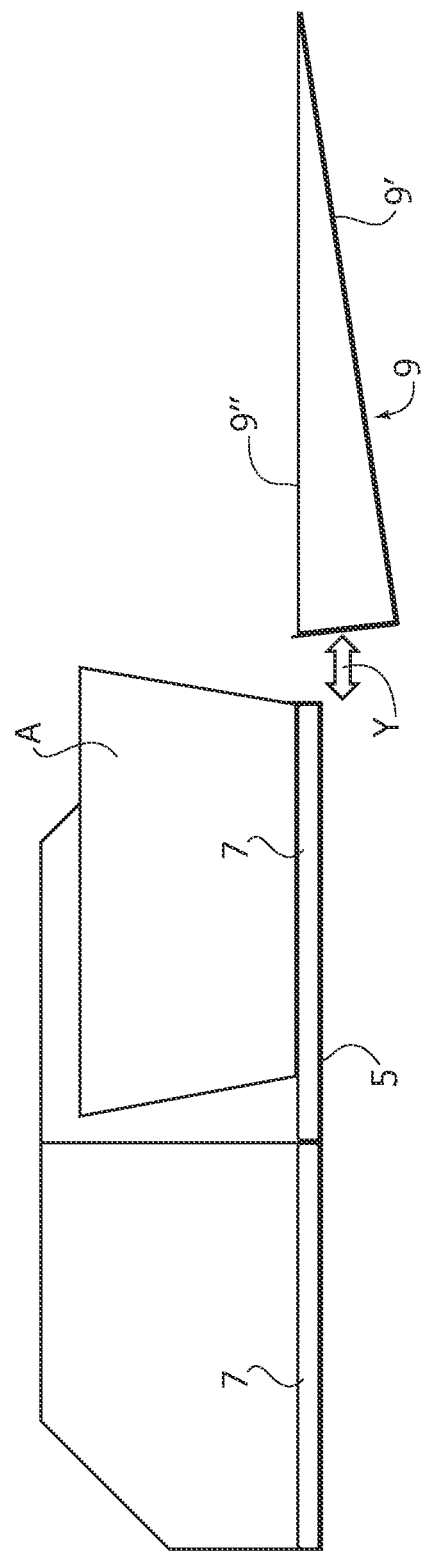

In one or more embodiments, the shelving unit 2 comprises support surfaces—for supporting the containers A—inclined forward and downwardly, to facilitate the removal of the containers A. In this connection, the shelving unit 2 may comprise holding structures 9 positioned on the support surfaces and provided for holding respective containers A (FIGS. 2A-2C). Preferably, the holding structures 9 may be realized with a shaped metal or plastic sheet. As illustrated in FIG. 2A, each holding structure 9 may be provided with a pair of stopper elements 17 for securely locking the containers A on the shelving unit 2. As illustrated in FIG. 2B, each holding structure 9 comprises a lower surface 9' inclined, in contact with the inclined support surface of the shelves of each row, and a horizontal upper surface 9" for facilitating the extraction operations for extracting the containers A from the shelving unit 2.

As illustrated in the embodiments of FIGS. 1-6, the conveyor device 3 transports the containers A along a first horizontal direction X, and the containers A constituting horizontal rows of stacked containers on the shelving unit 2 are arranged adjacent to each other along a horizontal direction parallel to said first horizontal direction X.

According to the invention, the automatic warehouse system 1 comprises at least one container shifting apparatus 4 interposed between the shelving unit 2 and the conveyor 3, configured for shifting containers A from the conveyor device 3 to the shelving unit 2 and vice-versa. To this end, the shelving unit 2 is arranged with the compartments facing the container shifting apparatus 4.

As illustrated in the FIGS. 1,3A,3B,5,6, the container shifting apparatus 4 comprises at least one platform 5 provided for automatically receiving containers A from the shelving unit 2 and/or the conveyor device 3. The platform 5 comprises holding areas 6 for temporarily hosting the containers A to be exchanged to the shelving unit 2 and/or the conveyor device 3. By way of the non-limiting example of the figures, the platform 5 comprises two holding areas 6, in such a way that the platform 5 is configured for simultaneously temporarily hosting two containers A (a first container A taken from the conveyor device 3 to be transferred to the shelving unit 2 and a second container A taken from the shelving unit 2 to be transferred to the conveyor device 3).

As indicated more in detail in the following, the platform 5 is provided for horizontally and vertically sliding through the conveyor device 3 and the shelving unit 2 along said first horizontal direction X and a vertical direction Z, in such a way that the platform 5 may be positioned with its support surface defined by the holding areas 6, substantially coplanar with the respective surfaces of a branch 30,31 of the conveyor device 3 and a determined compartment of the shelving unit 2. In this connection, the platform 5 may be arranged transversely (along a second horizontal direction Y) with respect to the conveying direction of the conveyor device 3 and to the horizontal rows of containers A stacked on the shelving unit 2 (FIGS. 1,5,6). In other words, the platform 5 may be driven vertically and horizontally alongside the conveyor device 3 and the shelving unit 2, for providing a shifting continuous surface with one conveyor branch and a determined compartment of the shelving unit 2. It is to be noted that in the case of inclined support surfaces of the shelves of the shelving unit 2, the platform 5 may be positioned substantially coplanar with the horizontal upper surface 9" of the holding structure 9 previously described.

According to different embodiments not illustrated, the container shifting apparatus 4 comprises at least two platforms 5 defining a single platform assembly. Said two platforms 5 may be vertically spaced at different heights, so as to provide different floors for transferring containers A from the conveyor device 3 to the shelving unit 2, and vice-versa. The single platform assembly may comprise two platforms 5 spaced side to side, so as to provide coplanar multiple holding areas 6 for automatically handling a plurality of containers A simultaneously.

In one or more embodiments, the container shifting apparatus 4 is connected to a plurality of rails 8, 8', 10, 10'(FIG. 1) provided for enabling horizontal and vertical travelling of the platform 5 alongside the conveyor device 3 and the shelving unit 2. Preferably, as illustrated in FIG. 1, the rails comprise a pair of horizontal rails 8, 8' spaced along the shelving unit 2 (or the conveyor device 3). A pair of vertically rails 10, 10' may be provided slidably mounted on the horizontal rails 8, 8'. The platform 5 is movable along the vertical direction Z on the vertical rails 10, 10', so as to enable vertical travelling of the platform 5 along the vertical rows of containers A stacked on the shelving unit 2 and/or along the branches 30, 31 spaced at different heights.

Naturally, the system 1 comprises a plurality of actuators for driving the vertical and horizontal movement of the platform 5. The actuators are not illustrated in the figures since they can be made according to any known configuration, and since elimination of these details from the figures makes the latter more readily and easily understood.

Of course, any known arrangement for providing vertical and horizontal sliding of the platform 5 may be used, according to various requirements of the system.

According to a further important feature of the invention, the container shifting apparatus 4 comprises shifting means 11 configured for transferring containers A from the shelving unit 2 and the conveyor device 3 to the platform 5, and vice-versa. The shifting means 11 may be driven between a passive position in which they do not interfere with the containers A conveyed on the conveyor device 3 and stacked on the shelving unit 2, and an active position in which they drive a transverse movement (along the second horizontal direction Y) of the containers A for carrying selected containers A onboard the holding areas 6 or releasing the containers A hosted on the holding areas 6.

As illustrated in FIGS. 2A-8B, the shifting means 11 comprise shifting forks 7 carried by the platform 5 and slidably mounted along a second horizontal direction Y perpendicular to said first horizontal direction X. The forks 7 may be driven between a retracted position (for example during movement of the platform 5 alongside the conveyor device 3 and the shelving 2) and an extended position towards the shelving unit 2 and/or the conveyor device 3 for picking a container A positioned on the shelving unit 2 or the conveyor device 3. As illustrated in FIGS. 3A,3B, the shifting forks 7 comprise an upper surface provided for coming into contact with the base of the containers A for extracting and/or releasing the containers A from/on the shelving unit 2 or the conveyor device 3. The forks 7 may be provided with their upper surface coplanar with the upper surface of the platform 5.

According to a preferred embodiment shown in the figures, each platform 5 may be provided with a pair of shifting forks 7 associated with each holding area 6. The forks 7 of each pair may be provided parallel and spaced apart from each other. The forks 7 of each pair may be driven along the second horizontal direction Y, respectively towards the conveyor device 3 and the shelving unit 2 (positioned at opposite sides with respect to the platform 5). In one or more embodiments, the shifting forks 7 have a telescopic structure extendable along the second horizontal direction Y, for reaching the containers A positioned on the shelving unit 2 or the conveyor branches 30,31.

As previously indicated the shelving unit 2 may have the support surface inclined forward and downwardly, carrying holding structures 9 with the upper surface 9" parallel to the horizontal surface of the platform 5. In this connection, as illustrated in the front view of FIG. 2, the holding structures 9 may comprise respective openings 12 for enabling passage of the shifting forks 7 through the holding structures 9, below the base of the container A to be picked.

Additionally, the forks 7 may be driven also along a vertical direction Z for facilitating extraction and releasing of the containers A from/on the shelving unit 2 and the conveyor device 3. It is to be noted that for obtaining the aforementioned effect for facilitating extraction and realising operations, it is the whole platform 5 that may be vertically driven. The actuators (for example electric motors) for driving movement of the forks 7 may be carried directly onboard the platform 5. Naturally, the pair of forks 7 may be driven once the platform 5 is positioned substantially coplanar and next to a horizontal row of the containers A stacked on the shelving unit 2 and to a branch 30, 31 of the conveyor 3. According to different embodiments, also the platform 5 may be driven along said second horizontal direction Y between the conveyor device 3 and the shelving unit 2.

As illustrated in FIG. 4, the conveyor device 3 may comprise receiving channels 13 interposed between the rollers 14, for enabling passage of the forks 7 in the extended position for releasing/extracting containers A on/from the conveyor device 3. According to the aforementioned vertical movement of the forks 7, the receiving channels 13 may be provided with sufficient height for allowing said vertical movement along the vertical direction Z.

According to preferred arrangements of the invention, the system 1 is configured for simultaneously transferring containers A to/from both the holding areas 6, so as to reduce handling cycle downtimes. The platform 5 and/or the shifting forks 7 may incorporate suitable sensors for detecting the extended/retracted positions of the forks 7 and the effective grip with the base of the containers A to be shifted.

As illustrated in FIG. 5, the container shifting apparatus 4 comprises a swivel unit 16 associated with the platform 5, provided for swivelling the platform 5 around a vertical axis I substantially about 180°, in opposite directions. The swivelling operation—driven by an actuator not illustrated—modifies the position of the containers A temporarily carried on the holding areas 6, with respect to the conveyor device 3 and the shelving unit 2. In other words, by the actuation of the swivelling unit 16, a first container A positioned on one holding area 6 adjacent to the conveyor device 3 (the first container A has been taken from the conveyor device 3) may be switched adjacent next to the shelving unit 2 (in order to shift the container A from the holding area 6 to the shelving unit 2). Similarly, a second container A positioned on one holding area 6, adjacent to the shelving unit 2 (the second container A has been taken from the shelving unit 2) may be switched adjacent next to the conveyor device 3 (in order to shift the container A from the holding area 6 to the conveyor device 3). Similarly, the swivelling unit 16 may be motorized for continuously driving the platform 5 around a vertical axis I about 360°.

According to further embodiments, the containers shifting operations are carried out without the aforementioned swivel unit 16. In this case, each platform 5 may temporarily host only one container A, due to the fact that before loading a second container A onboard the platform 5, the shifting means 11 has to transfer the current on-board container A from the platform 5 to the shelving unit 2 or the conveyor device 3. As illustrated in FIG. 6, the shifting means 11 may comprise a conveyor 15 provided on the platform 5 and movable along the second horizontal direction Y. According to the embodiment of FIG. 6, the conveyor 15 may be interposed between the forks 7 of each pair. In this connection, the shifting means 11 comprise further actuators (for example a pneumatic system) for driving a vertical relative movement between the conveyor 15 and the forks 7, for enabling shifting of a container A along the platform 5 for the releasing operations. In other words, during operation, a container A is carried onboard the platform 5 by the actuation of the forks 7; when the container A is onboard the platform 5, said further actuators drive a vertical relative movement between the conveyor 15 and the forks 7 for putting the surface of the conveyor 15 in contact with the base of the current onboard container A. Actuating the conveyor 15, the current onboard container A is shifted towards the shelving unit 2 or the conveyor device 3 for releasing the container A by means of the forks 7.

In one or more embodiments, the system 1 may comprise retaining means associated with the platform 5 and/or the base of the containers A, provided for securely locking the containers A on the surface of the forks 7 during extraction and releasing operations.

According to the embodiment illustrated in FIGS. 7A, 7B, the retaining means may comprise a plurality of rubber elements 18 provided on the upper surface of the shifting forks 7. The rubber elements 18 may be activated between a passive position in which they do not interfere with the gripping of the containers A and an active position in which they securely grip the base of the container A. The rubber elements 18 may be carried by an expandable structure connected to a closed chamber with a pressure source, so as to be driven in an active lifted position when the forks are in contact with the base of the container A to be picked.

In the embodiment of FIGS. 8A, 8B, the retaining means may comprise a plurality of vacuum caps 19 embedded within the forks 7. The vacuum cups 19 may be activated with a compressed air system ("Venturi effect"). The vacuum gripping condition remains active to retain the containers A on the forks 7 during the path in which the forks are driven from the extended position to the retracted position.

The automatic warehouse system 1 comprises at least one electronic control unit E (illustrated in FIG. 1) configured to control the operations for handling the containers A. Naturally, the system 1 may comprise a plurality of control units in communication to each other, for respectively driving different operations of the handling cycle.

According to the invention, the electronic control unit E is programmed for driving the transfer of containers A from the shelving unit 2 and the conveyor device 3, to the respective holding area 6, and exchanging the containers A with the conveyor device 3 and the shelving unit 2, sequentially or simultaneously. Preferably, the electronic control unit E is configured for enabling a simultaneous or sequential circulation of both empty containers A and formed full containers A. After the exchange operations of a pair of containers A are carried out, the electronic control unit E is configured for driving the vertical and horizontal sliding of the platform 5 along the conveyor device 3 and the shelving unit 2, in order to position the platform 5 substantially coplanar with a determined branch of the conveyor device 3 and a compartment of the shelving unit 2. Once the platform 5 stops at the selected position, the shifting means 11 are actuated for carrying containers A onboard the holding areas 6.

The electronic control unit E may be programmed for driving the entire handling cycle in order to minimize the downtime periods.

The electronic control unit E may be configured for automatically selecting a determined sequence of positions in which the platform 5 stops for loading new containers A, based on an automated evaluation criterion. Said automated evaluation criterion may consider at least one of the following:
- an information related to the containers A to be picked, such as the type of products contained, which may be acquired through reading a barcode present on the container A, before picking and/or placing it;
- the intended delivery destination of the containers A;
- timing of shipping; and
- other containers A previously picked in the same handling cycle.

In this connection, the system 1 may comprise a plurality of motion sensors configured for sending a command signal to the control unit E for confirming effective accomplishment of the different cycle steps (such as confirming the presence of containers A onboard the platform 5 and/or confirming release of the containers A on the conveyor branch 3 and the shelving unit 2).

In one or more embodiments, during operation, the electronic control unit E may drive the following cycle:
- sliding the platform 5 along the conveyor device 3 and the shelving unit 2,
- stopping the platform 5 at a selected position in which the platform 5 is substantially coplanar with the conveyor device 3 and a determined compartment holding surface of the shelving unit 2,
- pulling a full container A out from the shelving unit 2 by means of the shifting means 11 and shifting the full container A at a first holding area 6,
- pulling an empty container A out from the conveyor device 3 by means of said shifting means 11 and shifting the empty container A at a second holding area 6,
- driving the swivel unit 16 for swivelling the platform 5, and
- shifting the full and empty containers A, respectively towards the conveyor device 3 and the shelving unit 2.

It is to noted, that before the aforementioned pushing step, the electronic control unit E may drive sliding of the platform 5 (with the holding areas 6 loaded) for positioning the platform 5 at a new position for releasing the containers A temporarily hosted on the platform 5.

In one or more embodiments, during operation, the electronic control unit E may drive the following cycle:
- transferring an empty container A onboard the platform 5,
- sliding the platform 5 along the conveyor device 3 and the shelving unit 2,
- stopping the platform 5 at a selected position in which the platform 5 is substantially coplanar with the conveyor device 3 and a determined compartment holding surface of the shelving unit 2,
- driving the shifting forks for coupling with a full container A,
- positioning the full container A onboard the platform 5, by driving the forks from the extracted position to the retracted position,
- moving the platform 5 at a new selected position or driving the swivel unit 16,
- driving the forks 7 for releasing the empty container A, and
- driving the forks 7 for releasing the full container A.

As compared to the prior art, the method and system 1 according to the present invention have the following advantages:
- all the operations for handling the containers A are totally automated,
- ensuring high repeatability and reliability of the operations,
- ensuring quick automated operations for handling the containers A, and
- modulating the operations according to the logistic requirements.

The present invention is also related to an automatic warehouse system 1 for handling product containers A comprising:
- a shelving unit 2 comprising a plurality of compartments for holding and storing containers A arranged in rows,
- a conveyor device 3 configured for automatically conveying a plurality of containers A,
- at least one container shifting apparatus 4 interposed between said shelving unit 2 and said conveyor device 3, comprising:
- at least one platform 5 provided for automatically receiving containers A from the shelving unit 2 and the conveyor device 3, the platform 5 being movable along a first horizontal direction X and/or a vertical direction Z,
- wherein the container shifting apparatus 4 comprises shifting means 11 associated with the platform 5, configured for shifting containers A from the conveyor device 3 to the shelving unit 2, and vice-versa, via the platform 5,
- wherein the shifting means 11 comprise shifting forks 7 movably mounted along a second horizontal direction Y perpendicular to said first horizontal direction X, and an electronic control unit E programmed for driving said shifting means 11, so as to shift containers A from the conveyor device 3 to the shelving unit 2, and vice-versa.

According to further features of the invention, the system 1 comprises at least one pair of parallel forks 7 movably mounted along the platform 5 between a retracted position in which they do not interfere with the containers A conveyed on the conveyor device 3 and stacked on the shelving unit 2, and an extended position in which they drive a transverse movement along said second horizontal direction Y of the containers A for carrying selected containers A onboard the platform 5, wherein said forks 7 provide respective upper surfaces for coming into contact with a base of the containers A.

According to a preferred embodiment, said forks 7 are movable along said vertical direction Z for facilitating extraction and releasing of the containers A from the shelving unit 2 or the conveyor device 3.

According to further features of the invention, the shifting means 11 comprise a swivel with unit 16 associated with said platform 5, provided for swivelling the platform 5 around the vertical axis I, so as to move a container A positioned onboard the platform 5 from a first position adjacent to the shelving unit 2 to a second position adjacent to the conveyor device 3, and vice-versa.

According to a preferred embodiment, the shifting means 11 comprise a conveyor 15 provided on the platform 5 and movable along the second horizontal direction Y, for enabling shifting along the platform 5 of a container A carried onboard the platform 5 by means of said shifting forks 7.

According to a preferred embodiment, the system 1 comprises retaining means associated with the platform 5 and/or the base of the containers A, provided for securely locking the container A on the surface of the shifting forks (7) during extraction and releasing operation.

The present invention is also related to a computer program product, directly loadable in the memory of at least one computer and including software code portions to cause the device to perform the method of the annexed claims.

Of course, without prejudice to the principle of the invention, the details of construction and the embodiments can be widely varied with respect to those described and illustrated, without thereby departing from the scope of the invention as defined by the claims that follow.

The invention claimed is:

1. A method for automatically handling a plurality of product containers, comprising:
providing at least one container shifting apparatus interposed between a shelving unit and a conveyor device,
wherein the at least one container shifting apparatus comprises at least one platform provided configured for automatically receiving containers of the plurality of product containers from the shelving unit and/or the conveyor device,
moving the at least one platform alongside the conveyor device and the shelving unit along a first horizontal direction and/or a vertical direction,
stopping the at least one platform at a selected position in which the at least one platform is substantially coplanar with the conveyor device and a determined compartment holding surface of the shelving unit,
driving shifting means associated with the at least one platform for shifting containers from the conveyor device to the shelving unit and vice-versa, via the at least one platform,
wherein the shifting means comprise shifting forks movably mounted along a second horizontal direction perpendicular to said first horizontal direction,
wherein said shifting means comprise a swivel unit associated with said at least one platform, provided for swivelling the at least one platform around a vertical axis, so as to move a container of the plurality of product containers positioned onboard the at least one platform from a first position adjacent to the shelving unit to a second position adjacent to the conveyor device, and vice-versa,
extracting a first container of the plurality of product containers out from the shelving unit by means of said shifting forks and shifting the first container at a first holding area,
extracting a second container of the plurality of product containers out from the conveyor device by means of said shifting forks and shifting the second container at a second holding area,
driving the swivel unit for swivelling the at least one platform, and
shifting the first and second containers, respectively towards the conveyor device and the shelving unit, by means of said shifting forks driven in an extended position.

2. The method of claim 1, comprising temporarily hosting at least one container of the plurality of product containers at a respective holding area of the at least one platform, after extraction from the shelving unit or the conveyor device by means of said shifting forks.

3. The method of claim 1, comprising the step of driving the shifting forks between a retracted position in which they do not interfere with containers conveyed on the conveyor device and stacked on the shelving unit, and the extended position in which they drive a transverse movement along said second horizontal direction of the containers for carrying selected containers onboard the at least one platform.

4. The method of claim 1, comprising driving said shifting forks along said vertical direction for facilitating extraction and releasing of the containers from/to the shelving unit or the conveyor device.

5. The method of claim 1, comprising:
providing retaining means associated with the at least one platform and/or a base of the containers, provided for securely locking the container on a surface of the shifting forks during extraction and releasing operations, and
activating said retaining means when the shifting forks come into contact with the base of the container, before driving the forks in a retracted position for carrying the containers onboard the at least one platform.

6. The method of claim 2, comprising the step of synchronising a time at which an empty holding area is occupied by a new container to be shifted, with a time at which another container is transferred from an occupied holding area to the conveyor device or the shelving unit.

7. The method of claim 1, comprising moving said shifting forks along said vertical direction for facilitating extraction and releasing of the containers from the shelving unit or the conveyor device.

8. The method of claim 1, wherein said shifting means comprise a conveyor provided on the at least one platform and movable along the second horizontal direction, for enabling shifting along the at least one platform of a container carried onboard the at least one platform by means of said shifting forks.

* * * * *